Sept. 5, 1939. F. M. HESS 2,171,874
APPARATUS FOR EFFECTING LUBRICATION CONTROL
Filed Oct. 29, 1934 2 Sheets-Sheet 1
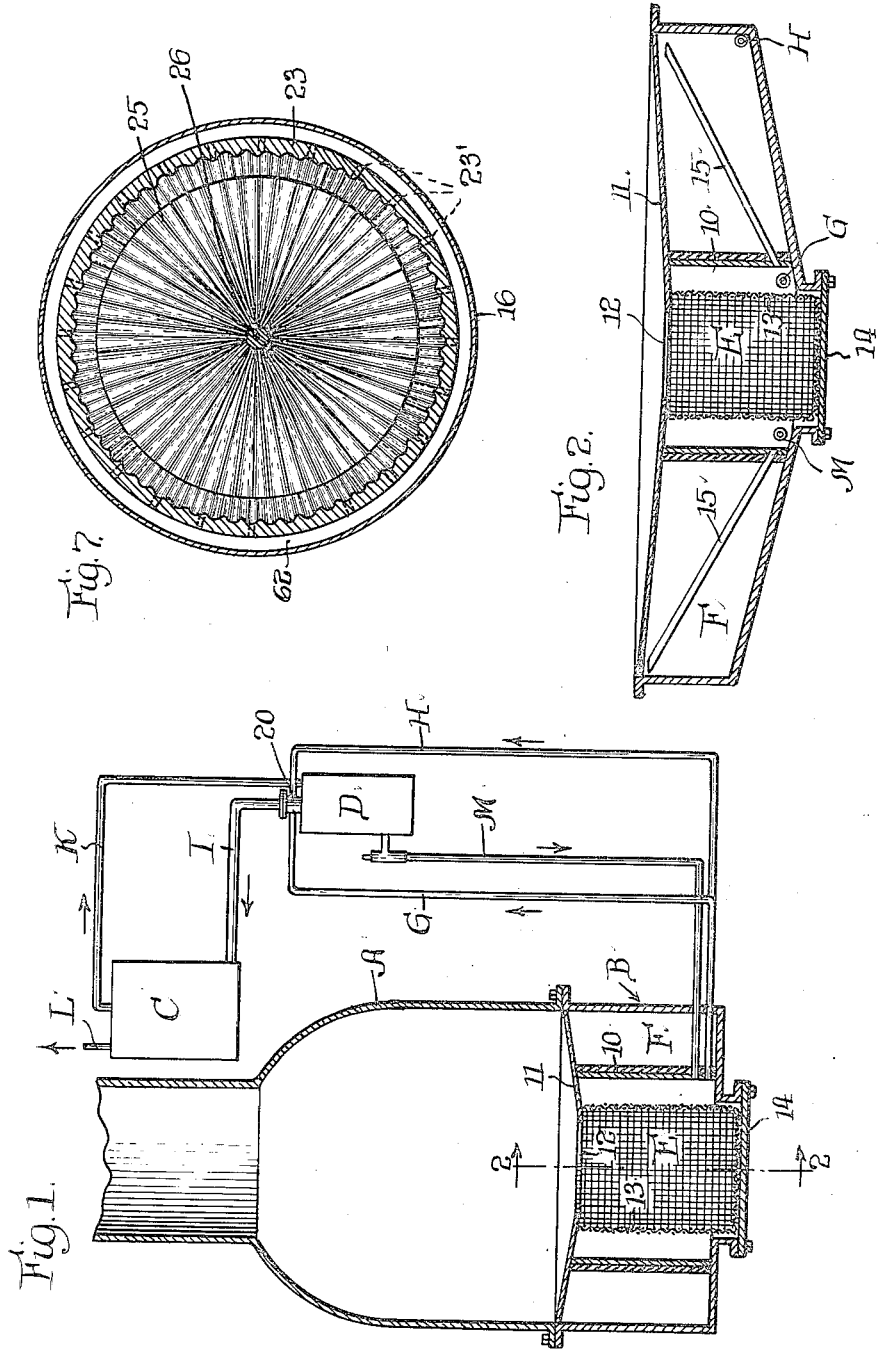
Inventor:
Francis M. Hess,
By Fisher, Clapp, Soans & Pond
Attys.

Sept. 5, 1939.  F. M. HESS  2,171,874
APPARATUS FOR EFFECTING LUBRICATION CONTROL
Filed Oct. 29, 1934   2 Sheets-Sheet 2
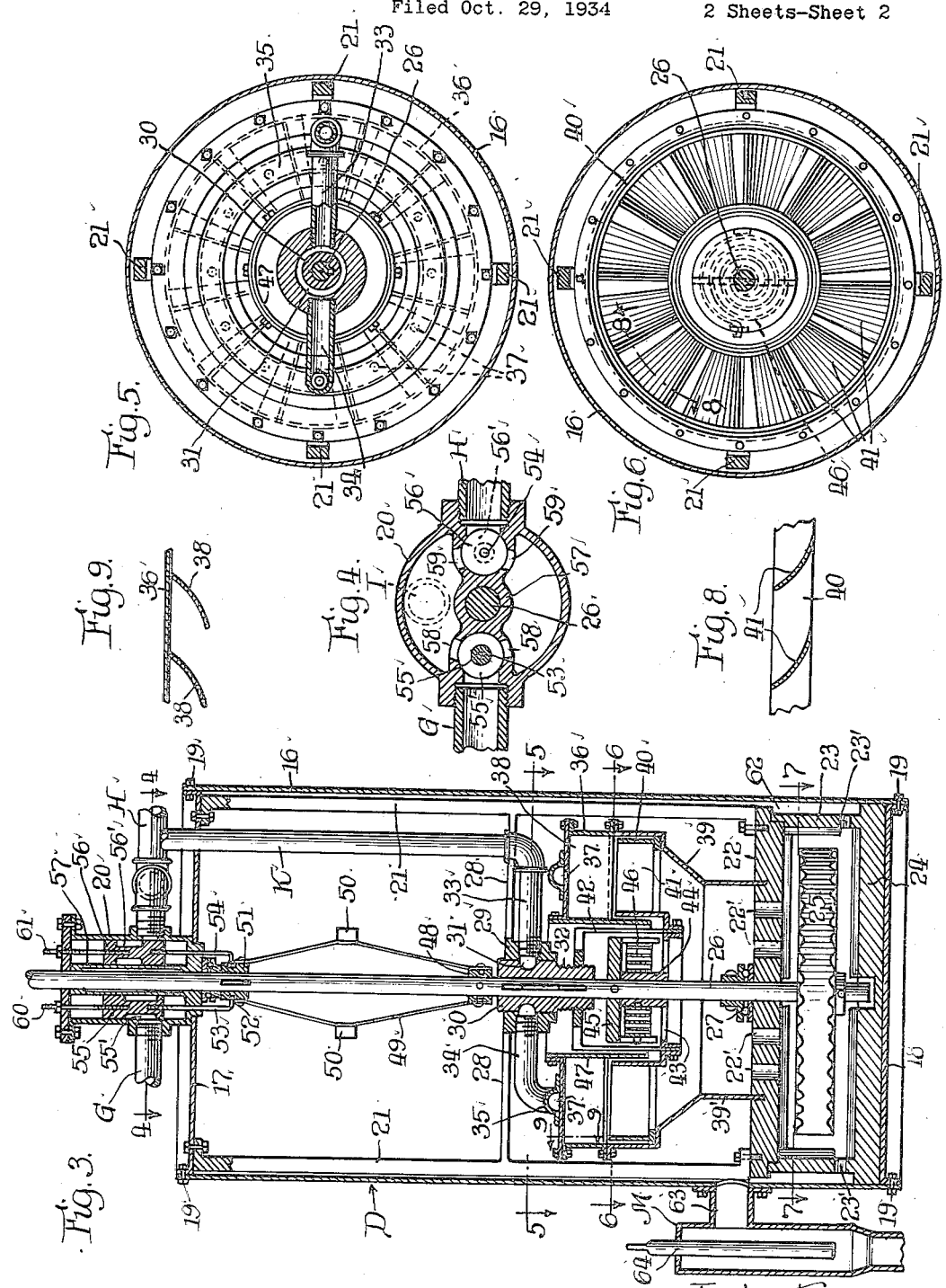
Inventor
Francis M. Hess,
By Fisher, Clapp, Soans + Pond, Attys.

Patented Sept. 5, 1939

2,171,874

UNITED STATES PATENT OFFICE 2,171,874

APPARATUS FOR EFFECTING LUBRICATION CONTROL

Francis M. Hess, Chicago, Ill.

Application October 29, 1934, Serial No. 750,565

7 Claims. (Cl. 184—104)

This invention relates to lubrication control, having reference more particularly to the lubrication systems of automobiles and other motor vehicles. An important factor in the proper performance of an automobile is correct lubrication. Every lubricant has a temperature gradient through which it gives the best performance. And one of the objects of this invention is to provide a means to establish the best oil temperature to employ, and then maintain that temperature under the varying conditions of atmospheric temperature and service to which motor vehicles are subjected in ordinary use. Another object is to provide a lubrication control system that will automatically adjust itself to forced feed lubrication systems of varying power. Another object is to reduce the dilution of the oil by gasoline to a minimum. Still other objects and advantages of the invention will be apparent to persons skilled in the art to which the invention relates from the following detailed description, taken in connection with the accompanying drawings, which illustrate one practical embodiment of the principle employed, and wherein—

Fig. 1 is a view partly in elevation and partly in vertical transverse section through the crank case of an automobile, showing the main features of the lubrication control system.

Fig. 2 is a vertical longitudinal section on the line 2—2 of Fig. 1.

Fig. 3 is an enlarged vertical axial section through a hot and cold oil mixer and a viscosity-controlled governor that actuates the same.

Fig. 4 is an enlarged plan section on the line 4—4 of Fig. 3.

Fig. 5 is a plan section on the line 5—5 of Fig. 3.

Fig. 6 is a plan section on the line 6—6 of Fig. 3.

Fig. 7 is a plan section on the line 7—7 of Fig. 3.

Fig. 8 is a detail section through the turbine motor, on line 8—8 of Fig. 6.

Fig. 9 is a detail section through an oil distributor of the turbine motor, on line 9—9 of Fig. 3.

Referring to the drawings, A designates the crank case of an automobile, to the bottom of which is attached an oil collecting pan B. C designates an oil circulating pump, and D designates as an entirety an oil viscosity control device, which is itself controlled by variations in the viscosity of the oil passing therethrough. The oil pan B is divided by a vertical partition 10 preferably of heat insulating material, into an inner hot oil chamber E and an outer cool oil chamber F. Above the chambers E and F and forming a top wall therefor is a dished plate 11 formed with a central hole 12 by which the oil in the crank case A is drained into the hot oil chamber E. Within this chamber is a screen 13, which rests on a cover plate 14 removably attached to the bottom of the pan B and closing an opening therein through which the screen 13 may be inserted and withdrawn. Referring to Fig. 2, within the outer cool oil chamber F are a number of upwardly and outwardly inclined overflow pipes 15 that at their lower ends communicate with the bottom of the hot oil chamber E, and transfer the hot oil in the latter chamber to the cool oil chamber F by overflow, the upper ends of the pipes 15 being slightly below the top of the hot oil chamber. This overflow communication is merely a precautionary provision. In normal operation this overflow never comes into use.

Referring to the member D which is shown in enlarged detail in Figs. 3 to 9 inclusive, this comprises a circular casing 16 having flanged top and bottom closure discs 17 and 18 fitted therein and secured thereto as by screw bolts 19. Mounted on the upper cover disc 17 is a circular valve casing 20 into one side of which leads a hot oil pipe G from the bottom of the hot oil chamber E, and into the other side of which leads a cool oil pipe H from the bottom of the cool reserve oil chamber F. From the top of the valve casing 20 (which also constitutes a mixing chamber for hot and cool oil) a suction pipe I leads to the suction side of the pump C. From the discharge side of the pump C a pipe K leads to and through the top wall 17 of the mixing device D, and another pipe L from the discharge side of the pump leads to the bearings and other parts to be lubricated. From the lower portion of the device D a return pipe M leads into the hot oil chamber E.

Turning now to a description of the viscosity-controlled oil temperature regulator D, and referring to Figs. 3 to 9 inclusive, within the casing 16 are four uprights 21 spaced 90° apart and bolted at their upper ends to the head member 17 and at their lower ends to a circular plate 22. Plate 22 rests upon the annular wall 23 of a cup-shaped member, the bottom or base wall 24 of which rests upon the bottom cover disc 18 of the casing. Parts 22, 23 and 24 together form a chamber, in which is rotatably mounted a viscosity controlled disc 25 fast on the lower end portion of a shaft 26 that extends upwardly through the top plate 22 and is provided with an anti-friction step bearing 27 on the latter. The shaft 26 extends upwardly through the head plate 17 and mixing chamber 20, being suitably journaled therein as hereinafter described.

Attached to or integral with the uprights 21 are radial ribs or spokes 28 carrying at their inner ends a hub 29 that forms a bearing for a vertically shiftable rotatable valve 30. This valve is formed with an annular groove 31 and with a threaded lower end portion 32. The pipe K which, as above mentioned, leads from the discharge side of the pump C, is formed at its lower end with a horizontal extension 33 leading into the hub 29 and communicating with the groove 31 of the valve 30; and on the opposite side of the valve 30 an elbow pipe 34 communicating at its inner end with the groove 31 leads to and communicates with an annular distributing half-pipe 35 that is bolted to the top wall of an oil guide and distributor 36. This latter overlies and distributes oil to an underlying turbine wheel, for which purpose the top wall of the distributor is provided with a series of holes 37 beneath the distributor pipe 35, and the oil passing under the pump pressure through the holes 37 impinges upon a series of curved blades or vanes 38 (Fig. 9).

Attached to the lower side of the annular oil guide and distributor 36 is a tapered skirt 39 formed with a narrowed lower portion 39' that forms a joint with the top plate 22, preferably entering an annular groove in the latter, as indicated in Fig. 3. This skirt 39 forms a support for the oil guide and distributor 36 and its upper cylindrical portion also forms a housing for a rotary turbine wheel 40, this latter being equipped with inclined blades 41 (Fig. 8) reversely inclined relatively to the stationary blades 38 of the overlying oil guide and distributor. The hub of the turbine wheel is attached at its lower end to an upwardly off-set spider 42, the hub of the spider having threaded engagement with the threaded lower end 32 of the valve 30. Within and attached to the turbine hub is a spider 43 formed with an upstanding hub 44 that encircles and is rotatable on the shaft 26. Pinned to the shaft 26 just above the hub 44 is a spider 45 encircling the hub 44, and between and attached to the spider 45 and hub 44 is a helical spring 46. A sleeve 47 secured at its upper end in a central opening in the top wall of the oil guide and distributor 36 depends through and forms the inner side wall of the oil guide and distributor, preferably extending into the downwardly offset hub portion of the turbine wheel.

The valve 30 is splined on the shaft 26, as indicated in Figs. 3 and 5 so as to rotate therewith but be capable of an up and down movement thereon. Attached at its lower end to the shaft 26 just above the valve 30 is the lower collar 48 of a centrifugal governor, the bow arms 49 of which carry weights 50 at their central portions and at their upper ends are attached to an upper collar 51 splined to and slidable on the shaft 26. The collar 51 is formed with an annular groove 52 engaged by the lower inwardly bent ends of a pair of rods 53 and 54. The upper end of rod 53 has threaded engagement with the lower end of a valve 55, and the upper end of rod 54 has similar threaded engagement with the lower end of a valve 56. Valves 55 and 56 are slidably mounted in circular casings forming parts of a bridge member 57 (Fig. 4) that extends across the mixing chamber 20. Valves 55 and 56 are formed with annular ducts 55' and 56', respectively, that are adapted to move more or less into and out of register with the hot and cool oil pipes G and H, respectively, and are also in register with lateral ports 58 and 59 in the casings of the valves 55 and 56, respectively, through which hot and cool oil may pass from the annular ducts of the valves into the mixing chamber 20. As shown in Fig. 3, the oil duct 55' of valve 55 is located somewhat lower than the oil duct 56' of valve 56, so that hot oil normally flows to the mixing chamber, while cool oil is largely or may be wholly cut off. The absolute and relative positions of these two valves may be adjusted by means of adjusting rods 60 and 61 mounted in the top wall of the mixing chamber 20 and having squared lower ends extending into correspondingly shaped holes in the upper ends of the valves. Manifestly, by turning either rod, its corresponding valve will be adjusted upwardly or downwardly on the rod 53 or 54 with which the valve has threaded engagement.

As best shown in Figs. 3 and 7, the viscosity controlled disc 25 is preferably formed with radially corrugated upper and lower sides, and the top, bottom and side walls of the chamber in which the disc rotates are similarly corrugated, with a view to creating a drag of the oil on the walls of the disc and chamber during the rotation of the disc. This feature, however, is disclosed in my copending application Serial 692,591 filed October 7, 1933, now Patent 2,076,816, and no claim thereto is made herein.

*Operation*

In the operation of the apparatus, primarily lubricating oil is forced to the main bearings under pressure through pipe L by the pump C. At the same time the pump C draws oil through pipe I from the mixing chamber 20, the hot oil entering the latter through pipe G from the lower portion of the hot oil well E. When the valve 56 is sufficiently lowered to bring its annular port 56' fully or partly in register with the cool oil pipe H, cool oil also enters the mixing chamber and lowers the temperatutre of the hot oil in the latter. A portion of the oil discharged by the pump C flows under pressure through pipe K and its extension 33, annular port 31 of valve 30, and pipe 34 into and filling the distributing channel 35, thence downwardly through the oil guide and distributor 36 onto the blades of the turbine wheel 40. The rotary movement of the turbine wheel 40 is transmitted through spider 43 and hub 44 and coil spring 46 to the spider 45 that is pinned to the shaft 26. This causes the disc 25 to rotate through the body of oil flowing down from the turbine wheel through the skirt 39, 39' and holes 22' in the plate 22 into the chamber containing the disc 25, and the drag of the oil on the disc governs its speed of rotation, the speed of course being slower when the oil is cool and relatively thick, and faster when the oil is hot and relatively thin. If the oil is above the proper temperature gradient for effective service, the increased speed of rotation of shaft 26 expands the governor and draws down the valves 55 and 56, which causes an increased amount of cool oil to flow into the mixing chamber 20, thus lowering the temperature and raising the viscosity of the oil that flows to the pump through the suction pipe I from the mixing chamber. On the other hand, if the temperature of the oil is below the proper temperature for most efficient work, the increased viscosity of the oil exerts a greater drag on the disc 25, lowers the speed of rotation of shaft 26; the governor contracts, raising the valves 55 and 56 and thereby partially or wholly cutting off the flow of cool oil to the mixing chamber so that the temperature of the oil flowing to the pump is increased and its viscosity lowered to the proper point. The operating parts are so adjusted as to normally maintain the oil at or near the correct temperature and viscosity. This adjustment is accomplished by the adjusting rods 60 and 61. If the temperature of the oil becomes too high, it is automatically lowered by increasing the flow of cool oil to the mixture, and if the temperature becomes too low, it is automatically raised by partially or wholly cutting off the flow of cool oil to the mixture. Primarily, the temperature of the circulating oil is indirectly affected by the cooling system of the car. If the cooling system is operating correctly, the temperature of the circulating oil will be within the desirable temperature gradient. In this normal operating condition the setting of rods 60 and 61 would adjust the apparatus so that the viscosity controlled valves 55 and 56 would deliver a circulating oil of the desired specific viscosity at that particular temperature gradient.

From the chamber in which the disc 25 rotates, the oil flows through openings 23' in the side wall of said chamber and an annular duct 62 surrounding the side wall, through a short pipe section 63 into the return pipe M, through which it is delivered back to the hot oil well E. A gas expansion type thermometer bulb 64 may be inserted in the upper end of return pipe M and pipe connected to a thermometer indicator on the instrument board, if desired, for visually showing the temperature of the oil. Also a viscosity indicating device may be geared to the upper end of shaft 26, and show the viscosity on the instrument board. These features form in part the subject matter of my pending application above identified, and are not essential to the present invention.

The overflow from the bearings in a drip system of crank lubrication drops down through the crank case A over the dished plate or apron 11 and into the filter 13 in the hot oil chamber E, and, in a splash system, joins the body of oil in the crank case. The walls of the filter are preferably made from two screen sections embracing a filter pad, which pad may be fabric or fuller's earth or any mixture that will be of sufficiently fine texture to thoroughly cleanse the hot oil and still allow it to flow through the pad while in a hot state. The filter also serves to trap any gasoline vapor that may escape past the cylinders of the motor and prevent it from passing through the pad. Strictly speaking this cannot be accomplished in mechanical fashion, but, by maintaining the oil hot enough before filtering, the gasoline vapor is held above its dew point. Then, if the trap is maintained and the vapor is not allowed to mingle with a cooler body of oil, the vapor will rise and escape as such from the crank case. The filter and hot oil chamber are always maintained substantially full by the elevated position of the discharge ends of the overflow pipes 15, so that the hot oil chamber is practically full of oil before any can overflow to the outer cool oil chamber F. Thus, only a minimum of circulating oil ever gets back to the reserve oil in chamber F, and this only occurs when the cooling system is not functioning properly. Also, all outflowing hot oil leaves the hot oil chamber E near its bottom. Thus, when it is necessary for oil to overflow from chamber E into chamber F no gasoline vapor is carried with it, and at all times only filtered oil gets back into chamber F. In addition, the hot oil chamber is completely surrounded at all times with a body of oil that serves as an insulating means, and as a result the unfiltered oil in chamber E is not affected by outside temperature influences. The object of filtering the oil while hot is to secure better filtration and also to prevent dirty oil from reaching the clean oil reserve maintained in chamber F, as well as to prevent dirty oil from being circulated back to the bearings. The filter 13 is so arranged that it can be readily removed for cleaning or replacing the pad by merely removing the bottom cover plate 14. Moreover, in a drip system the only oil removed when this is done is the small amount contained in filter 13 and in the hot oil well E, or in a splash system in addition to the body of oil in the crank case. The reserve supply in the outer and larger chamber F is not disturbed. This reserve supply in chamber F is replenished from time to time in any conventional manner from the outside. The means for doing this is not shown on the drawings; and it will be observed that there is no flow of oil from the cool oil chamber to the pump through the hot oil chamber and no normal flow of oil from the hot oil chamber to the cool oil chamber.

There is still another advantage of prime importance in filtering the oil while hot and before mixing with other oil. Oil used in the bearings and splashed in the crank case of a high speed engine is easily whipped to a froth or even an emulsion. This condition tends to thin the body of oil and to reduce its all round effectiveness. In a correction for this condition, the oil readily submits to filtering while hot. Filtering hot and under other conditions, such as the selection of a filtering medium best suited to the grade of oil used, preventing diluting elements from passing through the filter and thus counteracting emulsion tendencies, and adding cool oil after freeing the hot oil from dilution, re-establishes equilibrium in the total oil body and restores the oil to its original body and effectiveness. In fact, to secure the best lubrication, it is no less important to properly condition the physical structure of the oil than to control its temperature while using it.

It is not a function of this apparatus to primarily cool the engine. That is the function of the cooling apparatus, whether it be water cooling or air cooling. However, the thermometer on the dash, if used, will indicate how well the cooling system is functioning by telling how hot the oil circulating through the bearings is getting.

It is a function of this apparatus to establish a desirable temperature and viscosity gradient at which the oil should be used and then to maintain this gradient by mixing fresh cool oil reserve with the hot oil in the amount or proportion required to maintain the gradient and the proper specific viscosity for that gradient.

The function of the valve 30 is to provide a means for automatically adapting the present device to cars equipped with oil-circulating pumps of varying pressures. If the oil pressure delivered by a pump is abnormally high, the turbine wheel will be driven at an increased speed, winding up the spring 46 through which the rotary impulse is transmitted to the shaft 26, so that the spider 42 will momentarily be driven somewhat faster than the shaft 26 and valve 30, and consequently the valve 30 will be drawn downwardly by the spider 42, throttling down the oil pressure to a point where substantial equilibrium between the driving and driven parts is established. This last described feature, while desirable, is not essential to the functioning of the apparatus in establishing and maintaining a constant and correct temperature and viscosity of the oil.

I claim:

1. In a device for maintaining a substantially constant temperature gradient of oil in a forced feed lubricating system in which the oil becomes heated by use, the combination of a hot oil well, a cool oil well, a pump, a flow line from both of said wells to the suction side of said pump, a hot and cool oil mixer interposed in said flow line, a return line from the discharge side of said pump to said hot oil well, and means controlled by the viscosity of the oil in said return line controlling the amount of cool oil admitted to said mixer.

2. In a device for maintaining a substantially constant temperature gradient of oil in a forced feed lubricating system in which the oil becomes heated by use, the combination of a hot oil well, a cool oil well, a pump, a flow line from both of said wells to the suction side of said pump, a hot and cool oil mixer interposed in said flow line, a return line from the discharge side of said pump to said hot oil well, and means actuated by the oil in said return line and governed as to its speed by the viscosity of the oil therein controlling the amount of cool oil admitted to said mixer.

3. In a device for maintaining a substantially constant temperature gradient of oil in a forced feed lubricating system in which the oil becomes heated in use, the combination of a hot oil well, a cool oil well, a pump, a flow line from both of said wells to the suction side of said pump, a hot and cool oil mixer interposed in said flow line, said mixer including a mixing vessel and valves respectively controlling the admission of hot and cool oil thereto, a return line from the discharge side of said pump to said hot oil well, and mechanism for operating said valves controlled as to the extent of valve movement effected thereby by the viscosity of the oil in said return line.

4. In a device for maintaining a substantially constant temperature gradient of oil in a forced feed lubricating system in which the oil becomes heated in use, the combination of a hot oil well, a cool oil well, a pump, a flow line from both of said wells to the suction side of said pump, a hot and cool oil mixer interposed in said flow line, said mixer including a mixing vessel and valves respectively controlling the admission of hot and cool oil thereto, a return line from the discharge side of said pump to said hot oil well, and mechanism for operating said valves actuated by the oil in said return line and controlled as to the extent of valve movement effected thereby by the viscosity of the oil in said return line.

5. In a device for maintaining a substantially constant temperature gradient of oil in a forced feed lubricating system in which the oil becomes heated in use, the combination of a hot oil well, a cool oil well, a pump, a flow line from both of said wells to the suction side of said pump, a hot and cool oil mixer interposed in said flow line, said mixer including a mixing vessel and valves respectively controlling the admission of hot and cool oil thereto, a return line from the discharge side of said pump to said hot oil well, and mechanism for operating said valves, said mechanism including a governor connected to and moving said valves, and means driving said governor controlled as to speed of operation by the viscosity of the oil in said return line.

6. In a device for maintaining a substantially constant temperature gradient of oil in a forced feed lubricating system in which the oil becomes heated in use, the combination of a hot oil well, a cool oil well, a pump, a flow line from both of said wells to the suction side of said pump, a hot and cool oil mixer interposed in said flow line, said mixer including a mixing vessel and valves respectively controlling the admission of hot and cool oil thereto, a return line from the discharge side of said pump to said hot oil well, and mechanism for operating said valves, said mechanism including a centrifugal governor connected to and moving said valve, a shaft on which said governor is mounted, a disc fast on said shaft rotatable in a body of oil in said return line, and a motor driven by the oil in said return line for driving said shaft.

7. In a device for maintaining a substantially constant temperature gradient of oil in a forced feed lubricating system in which the oil becomes heated in use, the combination of a hot oil well, a cool oil well, a pump, a flow line from both of said wells to the suction side of said pump, a hot and cool oil mixer interposed in said flow line, said mixer including a mixing vessel and valves respectively controlling the admission of hot and cool oil thereto, a return line from the discharge side of said pump to said hot oil well, and mechanism for operating said valves, said mechanism including a governor connected to and moving said valves, a motor for driving said governor driven by the oil in said return line and controlled as to its speed of operation by the viscosity of the oil, a valve controlling the flow of oil to said motor, and means responsive to variations in pressure of the oil discharged by said pump for more or less throttling the flow of oil to said motor.

FRANCIS M. HESS.